(12) United States Patent
Branover et al.

(10) Patent No.: US 10,409,524 B1
(45) Date of Patent: Sep. 10, 2019

(54) DYNAMIC MEMORY TRAFFIC OPTIMIZATION IN MULTI-CLIENT SYSTEMS

(71) Applicant: Advanced Micro Devices, Inc., Santa Clara, CA (US)

(72) Inventors: Alexander J. Branover, Chestnut Hill, MA (US); Thomas James Gibney, Newton, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/962,997

(22) Filed: Apr. 25, 2018

(51) Int. Cl.
*G06F 3/06* (2006.01)
*G06F 1/3234* (2019.01)
*G06F 1/3218* (2019.01)

(52) U.S. Cl.
CPC .......... *G06F 3/0659* (2013.01); *G06F 1/3218* (2013.01); *G06F 1/3275* (2013.01); *G06F 3/067* (2013.01); *G06F 3/0625* (2013.01); *G06F 3/0634* (2013.01)

(58) Field of Classification Search
CPC ...... G06F 3/067; G06F 3/0634; G06F 3/0625; G06F 1/3275
See application file for complete search history.

(56) References Cited

U.S. PATENT DOCUMENTS

| | | | | |
|---|---|---|---|---|
| 2008/0228939 | A1* | 9/2008 | Samuels | H04L 67/2842 709/235 |
| 2011/0093925 | A1* | 4/2011 | Krishnamoorthy | G06F 21/6218 726/4 |
| 2013/0019072 | A1* | 1/2013 | Strasser | G06F 11/1044 711/154 |
| 2014/0237175 | A1* | 8/2014 | Felch | G06F 9/3851 711/105 |

\* cited by examiner

*Primary Examiner* — Than Nguyen
(74) *Attorney, Agent, or Firm* — Meyertons Hood Kivlin Kowert and Goetzel PC; Rory D. Rankin

(57) ABSTRACT

Systems, apparatuses, and methods for dynamically optimizing memory traffic in multi-client systems are disclosed. A system includes a plurality of client devices, a memory subsystem, and a communication fabric coupled to the client devices and the memory subsystem. The system includes a first client which generates memory access requests targeting the memory subsystem. Prior to sending a given memory access request to the fabric, the first client analyzes metadata associated with data targeted by the given memory access request. If the metadata indicates the targeted data is the same as or is able to be derived from previously retrieved data, the first client prevents the request from being sent out on the fabric on the data path to memory subsystem. This helps to reduce memory bandwidth consumption and allows the fabric and the memory subsystem to stay in a low-power state for longer periods of time.

20 Claims, 6 Drawing Sheets

US 10,409,524 B1

DYNAMIC MEMORY TRAFFIC OPTIMIZATION IN MULTI-CLIENT SYSTEMS

BACKGROUND

Description of the Related Art

Computing systems are increasingly integrating large numbers of different types of components on a single chip or on a multi-chip module. The complexity and power consumption of a system increases with the number of different types of components. Often, these components are connected together via switches, routers, communication buses, bridges, buffers, controllers, coherent devices, and other links. The combination of these interconnecting components is referred to herein as a "communication fabric", or "fabric" for short. Generally speaking, the fabric facilitates communication by routing messages between a plurality of components on an integrated circuit (i.e., chip) or multi-chip module. Examples of messages communicated over a fabric include memory access requests, status updates, data transfers, coherency probes, coherency probe responses, and the like.

Power management is an important aspect of the design and operation of integrated circuits, especially those circuits that are integrated within mobile and other battery powered devices. In such battery power devices, reducing power consumption in the integrated circuits helps to increase the life of the battery as well as decrease the heat generated by the integrated circuits. However, it can be challenging to reduce power consumption in multi-client systems with multiple clients sending requests to a memory subsystem and/or other shared resources.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for dynamically optimizing memory traffic in multi-client scenarios are disclosed herein. In one implementation, a system includes at least one or more clients, a memory subsystem, and a communication fabric coupled to the clients and memory subsystem. A first client generates compressed data and metadata describing the compressed data and then stores the compressed data and metadata in the memory subsystem. A second client retrieves a portion of the compressed data and the metadata. For subsequent memory access requests generated by the second client, the second client analyzes the metadata to determine whether the requests should be sent out on the fabric and on a data path to the memory sub system.

If the analysis of the metadata determines that a given memory access request targets data that is the same as previously retrieved data or is able to be derived from previously retrieved data, then the second client prevents the given memory access request from being sent out on the data path to the memory subsystem via the fabric. For example, in one implementation, the metadata indicates that data targeted by the given memory request is the same as data that already resides on the second client. In another example, the metadata indicates that data targeted by the given memory access request is some fixed difference (i.e., a delta) from previously retrieved data. Accordingly, in these examples, the second client generates the targeted data from the previously retrieved data and prevents the given memory access request from being sent out on the data path to the memory subsystem via the fabric. This helps to reduce overall memory bandwidth utilization and reduces the power consumption of the system by allowing the fabric and the memory subsystem to spend more time in a low-power state.

Figure 1:
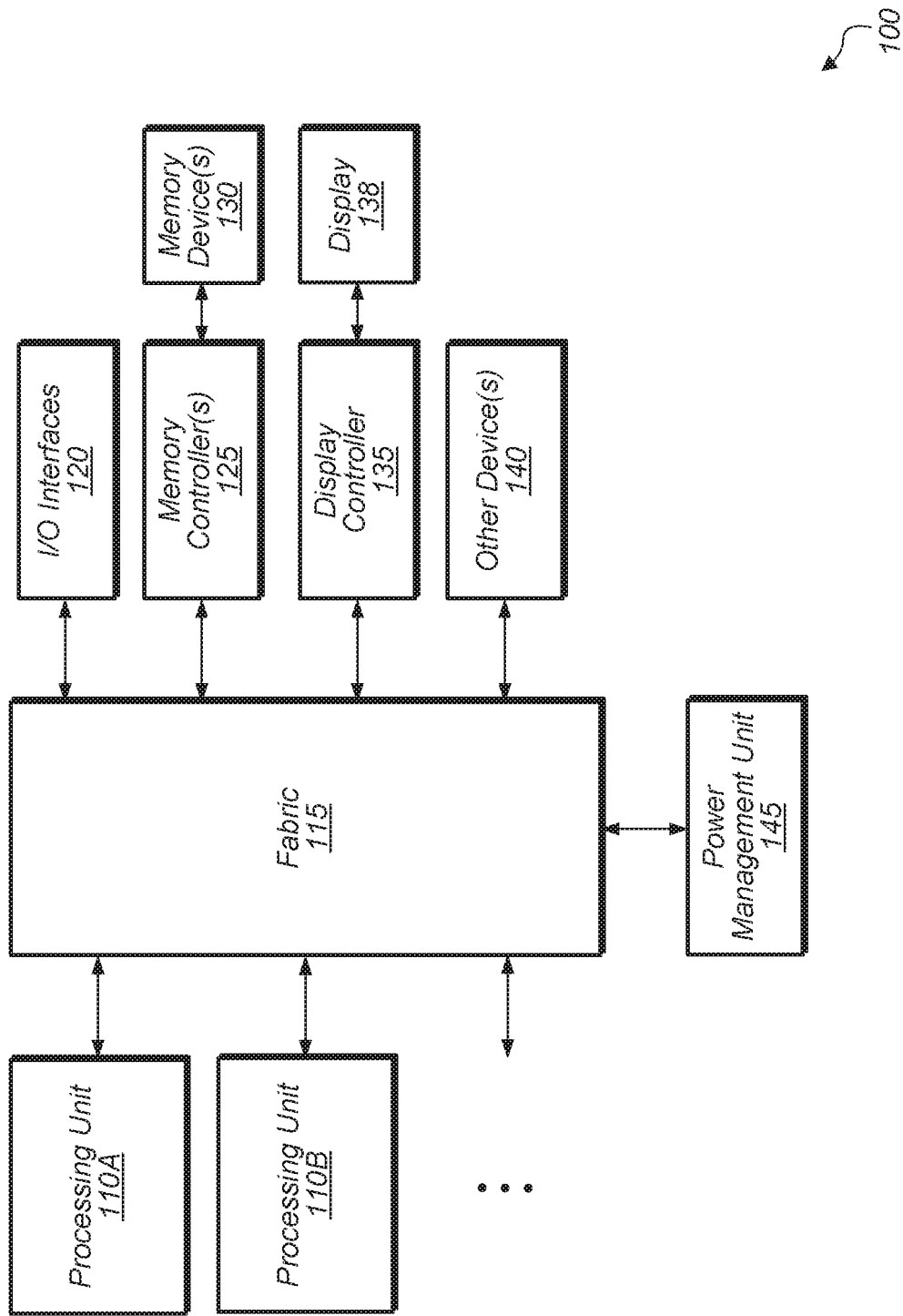
FIG. 1 is a block diagram of one implementation of a computing system.

Referring now to FIG. 1, a block diagram of one implementation of a computing system 100 is shown. In one implementation, computing system 100 includes at least processing units 110A-B, fabric 115, input/output (I/O) interfaces 120, memory controller 125, memory device(s) 130, display controller 135, display 138, other device(s) 140, and power management unit 145. In other implementations, computing system 100 includes other components and/or computing system 100 is arranged differently. Processing units 110A-B are representative of any number and type of processing units. For example, in one implementation, processing unit 110A is a central processing unit (CPU) and processing unit 110B is a graphics processing unit (GPU). In other implementations, processing units 110A-B includes other numbers and types of processing units (e.g., digital signal processor (DSP), field programmable gate array (FPGA), application specific integrated circuit (ASIC)).

A GPU is a complex integrated circuit that performs graphics-processing tasks in some implementations. For example, a GPU executes graphics-processing tasks required by an end-user application, such as a video-game application. In various implementations, the GPU is a discrete device or the GPU is included in the same device as another processor, such as a CPU. A GPU produces the pixels that make up an image from a higher level description of its components in a process known as rendering. GPUs typically utilize a concept of continuous rendering by the use of computing elements to process pixel, texture, and geometric data.

Fabric 115 is representative of any communication interconnect and any protocol utilized for communicating among the components of the system 100. Fabric 115 provides the data paths, switches, routers, multiplexers, controllers, and other logic that connect the processing units 110A-B, I/O interfaces 120, memory controller(s) 125, display controller 135, and other device(s) 140 to each other. Fabric 115 handles the request, response, and data traffic, as well as probe traffic to facilitate coherency. Fabric 115 also handles interrupt request routing and configuration access paths to the various components of system 100. In various implementations, fabric 115 is bus-based, including shared bus configurations, crossbar configurations, and hierarchical buses with bridges. In various implementations, fabric 115 is also packet-based and hierarchical with bridges, crossbar, point-to-point, or other interconnects. From the point of view of fabric 115, the other components of system 100 are referred to as "clients". Fabric 115 processes requests generated by various clients and passes the requests on to other clients.

In one implementation, power management unit 145 manages the transitions of components between different power states. For example, power management unit 145 reduces the power consumption of system 100 by putting one or more components in a low power state when these one or more components are not being actively used. When these component(s) become active again, power management unit 145 returns the component(s) to a higher power state. A "low power state" as defined herein is a state in which a voltage supplied to the component(s) is reduced from its maximum, a state in which the frequency of the clock signal is reduced, a state in which the clock signal is inhibited from the component(s) (clock-gated), one in which power is removed from the component(s), or a combination of any of the former.

Memory device(s) 130 are representative of any number and type of memory devices. For example, the type of memory in memory device(s) 130 includes Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processing units 110A-B, I/O interfaces 120, display controller 135, and other device(s) 140 via fabric 115 and memory controller(s) 125. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Other device(s) 140 are representative of any number and type of devices (e.g., multimedia device, video codec).

In various implementations, computing system 100 is a computer, laptop, mobile device, server or any of various other types of computing systems or devices. It is noted that the number of components of computing system 100 varies from implementation to implementation. In other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
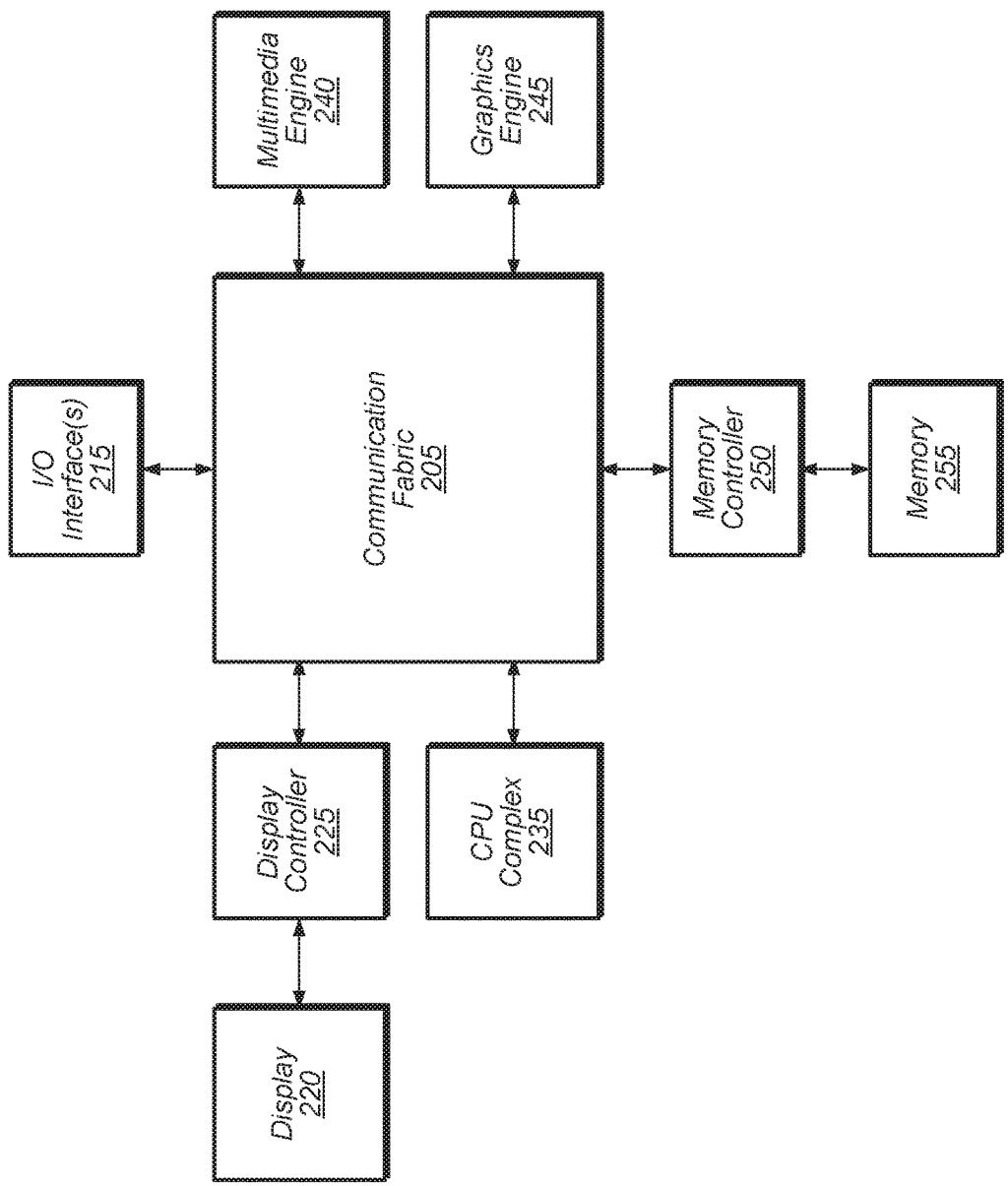
FIG. 2 is a block diagram of another implementation of a computing system.

Turning now to FIG. 2, a block diagram of another implementation of a computing system 200 is shown. In one implementation, computing system 200 includes a plurality of clients coupled to communication fabric 205. These clients include I/O interface(s) 215, display controller 225, CPU complex 235, multimedia engine 240, and graphics engine 245. It is noted that communication fabric 205 is also referred to herein as a "fabric" for short. The clients of fabric 205 send memory access requests to memory controller 250 and memory 255 via fabric 205. It is noted that memory controller 250 and memory 255 are also referred to herein as a "memory subsystem". Also, it should be understood that in other implementations, a memory subsystem includes multiple memory controllers and multiple memory devices.

Any number and type of peripheral devices (not shown) are coupled to I/O interface(s) 215. CPU complex 235 includes any number of processor cores for executing program instructions to realize the desired functionality of system 200. CPU complex 235 includes a cache subsystem with one or more caches for storing instructions and data. Multimedia engine 240 includes various circuitry such as a video decoder, video encoder, image signal processor, and so on.

In one implementation, graphics engine 245 produces the pixels that make up an image from a higher level description of its components in a process known as rendering. In one implementation, graphics engine 245 includes computing elements for processing pixel, texture, and geometric data. The computing elements execute the functions of rasterizers, setup engines, color blenders, hidden surface removal, texture mapping, etc. Much of the processing involved in generating complex graphics scenes involves texture data. Textures include any of various types of data, such as color, transparency, lookup tables, or other data. In some implementations, textures are digitized images to be drawn onto geometric shapes to add visual detail. A large amount of detail, through the use of textures, is mapped to the surface of a graphical model as the model is rendered to create a destination image. The purpose of texture mapping is to provide a realistic appearance on the surface of objects. Textures specify many properties, including colors, surface properties like specular reflection or fine surface details in the form of normal or bump maps. In various implementations, a texture includes image data, color or transparency data, roughness/smoothness data, reflectivity data, etc.

In 3D computer graphics, surface detail on objects is commonly added through the use of textures. For example, a 2D bitmap image of a brick wall is applied, using texture mapping, to a set of polygons representing a 3D model of a building to give the 3D rendering of that object the appearance that it is made of bricks. Providing realistic computer graphics typically requires many high-quality, detailed textures. The use of textures consumes large amounts of storage space and bandwidth, and consequently textures are compressed to reduce storage space and bandwidth utilization.

Compressing textures and surfaces reduces storage and bandwidth costs while retaining as much of the quality of the original textures and surfaces as possible. Compression is used to decrease the amount of data fetched from memory or cache for processing by the various clients of system 200. Accordingly, graphics engine 245 compresses textures and surfaces and then stores these compressed textures and surfaces in memory 255. Graphics engine 245 also generates metadata which describes the compressed textures and surfaces stored in memory 255. This metadata is also stored in memory 255. Depending on the implementation, the metadata is stored together with the corresponding compressed texture or surface or stored separately. When consuming clients access/retrieve a compressed texture or surface from memory 255, the consuming client retrieves the corresponding metadata from memory 255.

In one implementation, in order to save power, fabric 205 and the memory subsystem enter a low-power state during periods of low activity by system 200. However, when a client needs to send a memory access request to the memory subsystem via fabric 205, this results in fabric 205 and the memory subsystem waking up and transitioning back to a higher power state. In one implementation, in order to minimize power consumption, the clients of system 200 attempt to reduce the number of memory access requests that are sent to the memory subsystem via fabric 205. In one implementation, this reduction is achieved by performing an analysis of metadata corresponding to data being targeted by the memory access requests. If a given client determines that first data being targeted by a memory access request is able to be derived from previously retrieved second data, the given client prevents the memory access request from being sent out on fabric 205.

In one implementation, display controller 225 retrieves data from memory 255 and drives the data to display 220. In some cases, large portions of a frame being driven to display 220 have the same color content as previous portions or are fixed offsets from previous portions. For example, idle screen desktop images have large areas with the same color content. As used herein, the term "idle screen" refers to display content that is static (i.e., not changing) over a given period of time. Rather than fetching the data, or sending a zero sized request out to fabric 205, and potentially waking up fabric 205 and the memory subsystem, display controller 225 generates portions of the frame or swaths of the display lines from previously retrieved data. This helps to reduce memory bandwidth utilization and power consumption of system 200. For implementations when system 200 is a mobile device or mobile computing system running on battery power, this helps to extend the battery life of system 200.

Figure 3:
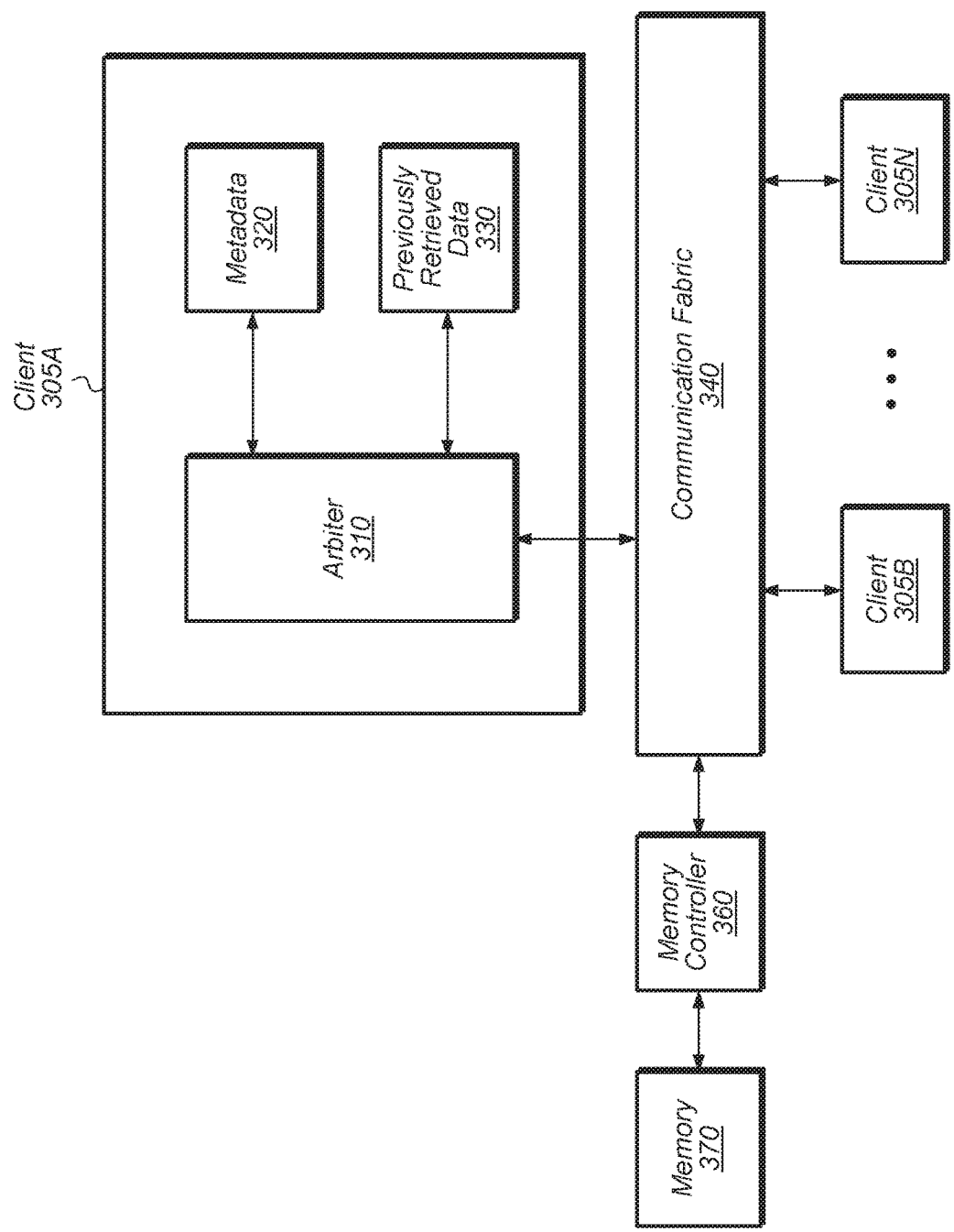
FIG. 3 is a block diagram of one implementation of multiple clients coupled to a fabric.

Referring now to FIG. 3, a block diagram of one implementation of multiple clients coupled to a fabric is shown. In one implementation, a system includes multiple clients 305A-N coupled to a communication fabric 340. It is noted that clients 305A-N are also referred to as "client devices" herein. Communication fabric 340 is also coupled to memory controller 360 which is coupled to memory 370. It is noted that some implementations have multiple memory controllers and multiple memory devices. The system also includes any number of other components and/or interfaces (e.g., I/O interfaces) coupled to communication fabric 340 which are not shown in FIG. 3 to avoid obscuring the figure.

Each client 305A-N accesses memory 370 via fabric 340 and memory controller 360. However, these accesses consume memory bandwidth and power when traversing the data path to memory 370. In some cases, fabric 340, memory controller 360, and/or memory 370 are in a low-power state when one of clients 305A-N initiates an access to memory 370. These accesses cause fabric 340, memory controller 360, and/or memory 370 to exit the low-power state and reenter a higher power state, which results in increased power consumption. Accordingly, clients 305A-N include mechanisms to reduce the memory bandwidth consumption and/or power consumption resulting from their memory access requests.

In one implementation, client 305A includes arbiter 310 which determines whether to forward a memory access request to fabric 340. Arbiter 310 is implemented using any suitable combination of hardware and/or software. In one implementation, arbiter 310 determines whether to forward the memory access request onto fabric 340 based at least in part on an analysis of metadata 320. For example, if metadata 320 indicates that the data being fetched is the same as some portion of previously retrieved data 330 or is able to be derived from previously retrieved data 330, then arbiter 310 does not send the request out onto fabric 340. Rather, in one implementation, arbiter 310 retrieves this portion of data from previously retrieved data 330 and supplies this portion of data to the requesting agent (e.g., a display controller, a processing unit, a direct memory access (DMA) engine). In another implementation, if the data being fetched is a fixed delta of some portion of previously retrieved data 330, then arbiter 310 generates the targeted data from this portion of previously retrieved data 330. In one implementation, the size of buffer 330 defines the depth of the lookup of metadata 320. In some implementations, the policy of filling buffer 330 is governed by the specific surface or texture images.

In one implementation, client 305A is a display controller coupled to a display (not shown). For example, in one implementation, arbiter 310 is fetching a compressed surface, and arbiter 310 retrieves the metadata 320 corresponding to the compressed surface. As arbiter 310 is fetching lines from the compressed surface, if metadata 320 indicates that the next line is the same as a previous line, then arbiter 310 does not send the next request out onto fabric 340. Or if metadata 320 indicates that the next line is a delta from the previous line or one of the previous lines, then arbiter 310 does not send the next request out onto fabric 340.

In other implementations, client 305A is any of various other types of clients. It is noted that client 305A also includes other circuitry (e.g., processing unit(s), memory device(s)) which is not shown to avoid obscuring the figure. It is also noted that in various implementations, one or more of clients 305B-N also include similar circuitry to what is shown for client 305A. Additionally, some of clients 305B-N are producer clients with circuitry for compressing data and generating corresponding metadata.

Figure 4:
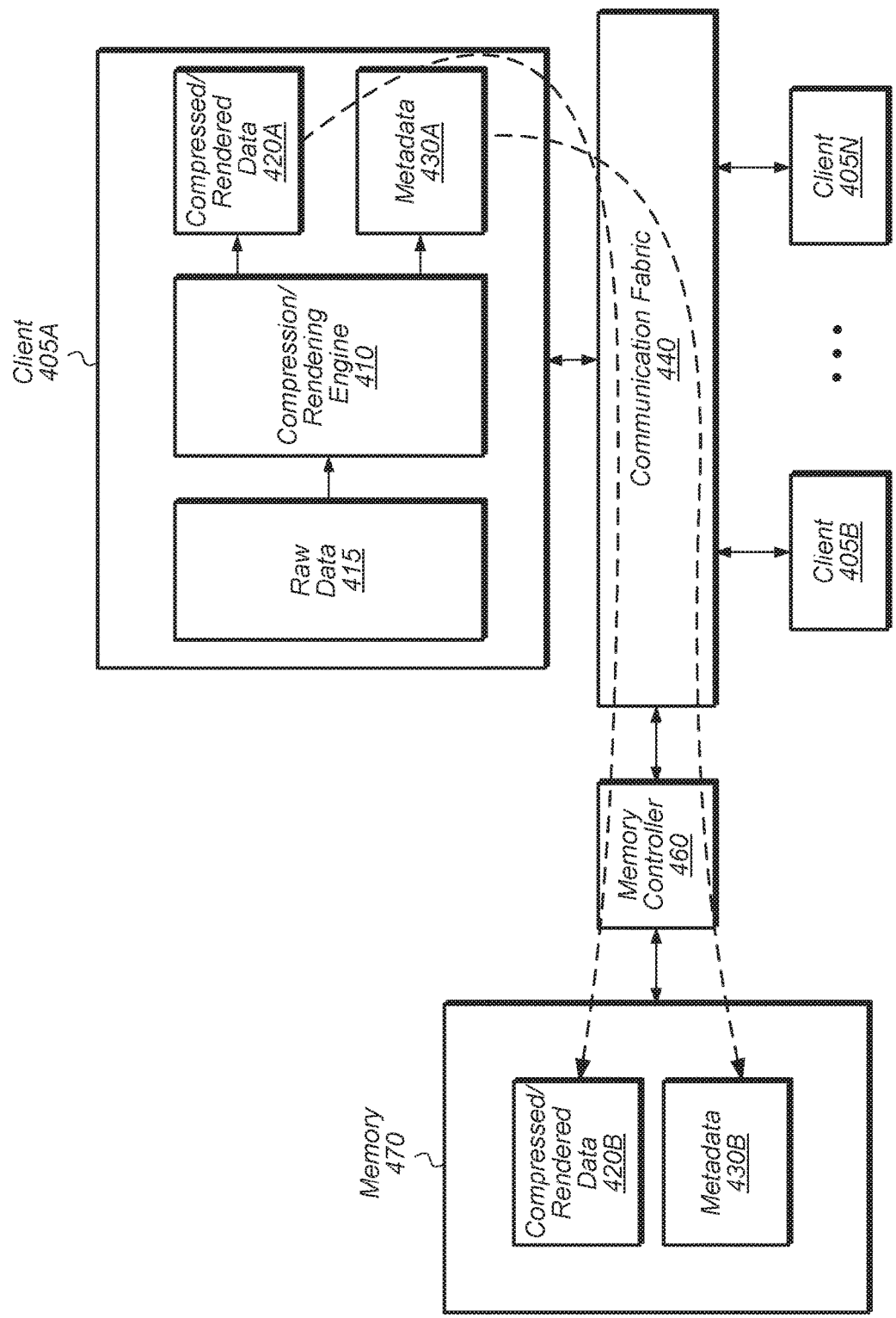
FIG. 4 is a block diagram of one implementation of a producer client among a plurality of clients.

Turning now to FIG. 4, a block diagram of one implementation of a producer client among a plurality of clients is shown. Client 405A is representative of any number and type of producer clients which generate compressed data and corresponding metadata from raw data. In one implementation, client 405A includes compression engine 410 for compressing raw data 415 into compressed data 420A. In another implementation, client 405A includes rendering engine 410 for generating rendered data 420A from raw graphics data 415. In other implementations, client 405A includes other circuitry for generating compressed or rendered data 420A and corresponding metadata 430A. In one implementation, compressed/rendered data 420A includes compressed surfaces which will be driven to a display by a display controller.

It is noted that metadata 430A includes information regarding compressed/rendered data 420A. In other words, metadata 430A includes information that allows portions of compressed/rendered data 420A to be derived from other portions of compressed/rendered data 420A. For example, some of the portions of compressed/rendered data 420A are the same as previous portions of compressed/rendered data 420A. Metadata 430A stores indications of which portions are repeated versions of the previous portions of compressed/rendered data 420A. Also, metadata 430A stores indications of portions that are fixed differences from other portions of compressed/rendered data 420A.

In one implementation, after client 405A generates compressed/rendered data 420A and metadata 430A, client 405A writes compressed/rendered data 420A and metadata 430A to memory 470. Compressed/rendered data 420B and metadata 430B represent the stored versions of compressed/rendered data 420A and metadata 430A, respectively, which are written to memory 470. Other consumer clients 405B-N are then able to access and consume compressed/rendered data 420B and metadata 430B from memory 470. Alternatively, client 405A is able to access and consume compressed/rendered data 420B and metadata 430B from memory 470 at a later point in time. In other words, in one implementation, client 405A is both a producer and a consumer of data.

Figure 5:
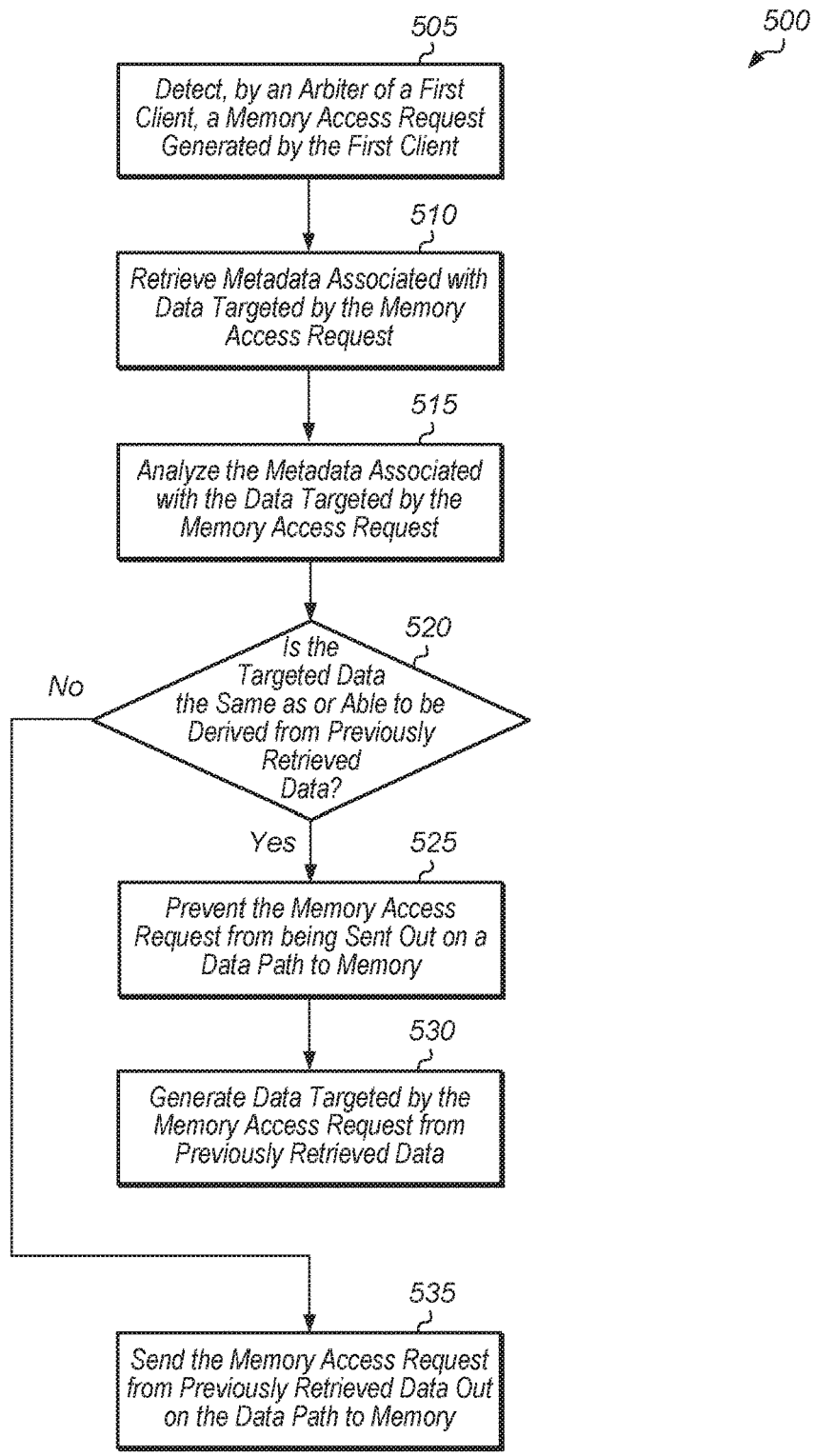
FIG. 5 is a generalized flow diagram illustrating one implementation of a method for dynamically optimizing memory traffic in a multi-client system.
Figure 6:
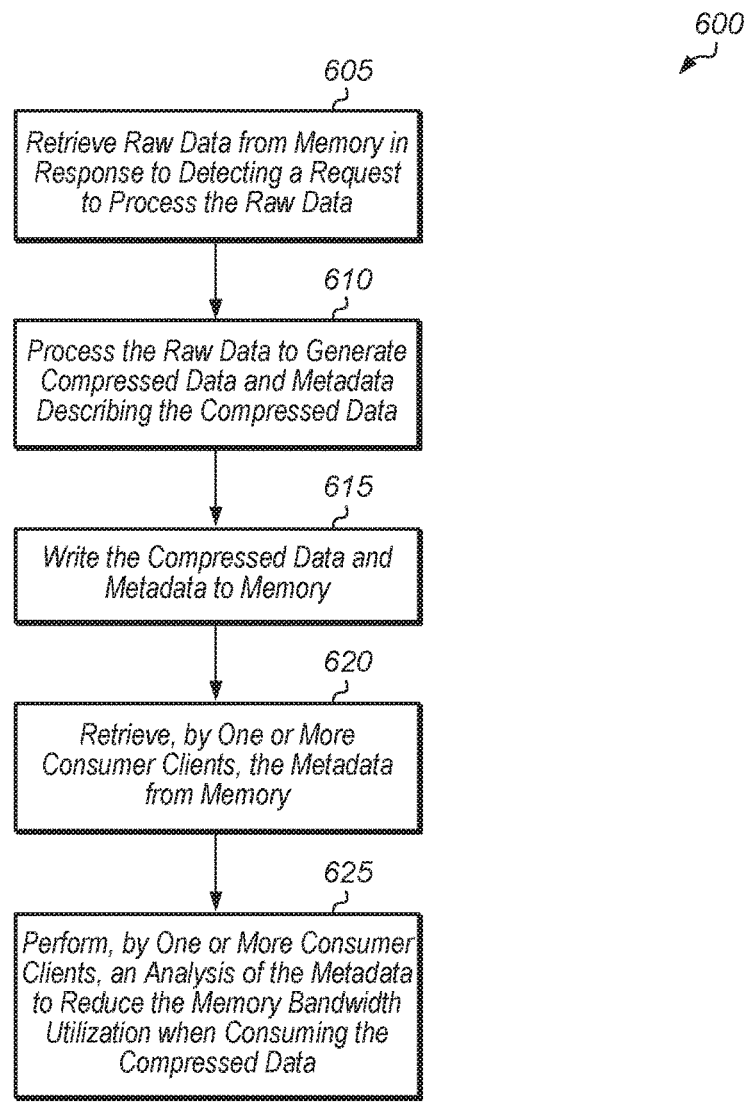
FIG. 6 is a generalized flow diagram illustrating one implementation of a method for a producer client generating metadata corresponding to compressed data.

Referring now to FIG. 5, one implementation of a method 500 for dynamically optimizing memory traffic in a multi-client system is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A memory access arbiter (or arbiter, for short) of a first client receives a memory access request (block 505). In response to receiving the memory access request, the arbiter retrieves metadata associated with data targeted by the memory access request (block 510). Then, the arbiter analyzes the metadata associated with the data targeted by the memory access request (block 515). In one implementation, analyzing the metadata involves determining if data targeted by the memory access request is the same as or is able to be derived from previously retrieved data.

If the metadata indicates that the data targeted by the memory access request is the same as or is able to be derived from previously retrieved data (conditional block 520, "yes" leg), then the arbiter prevents the memory access request from being sent out on a data path to memory (block 525). In one implementation, the first component on the data path to memory is a communication fabric. It is noted that in one implementation, preventing the memory access request from being sent out on the data path to memory prevents the fabric and/or memory subsystem from having to exit a low-power state. This helps to reduce power consumption of the system. After block 525, the arbiter generates data targeted by the memory access request from previously retrieved data (block 530). After block 530, method 500 ends. If the metadata indicates that the data targeted by the memory access request is not the same as and is not able to be derived from previously retrieved data (conditional block 520, "no" leg), then the arbiter sends the memory access request out on the data path to memory (block 535). After block 535, method 500 ends.

Turning now to FIG. 6, one implementation of a method 600 for a producer client generating metadata corresponding to compressed data is shown. A producer client retrieves raw data from memory in response to detecting a request to process the raw data (block 605). In one implementation, the producer client is a graphics engine and the raw data is graphics-related data. In another implementation, the producer client is a video encoder and the raw data is uncompressed video data. In other implementations, the producer client is other types of clients and/or the raw data is other types of data.

Next, the producer client processes the raw data to generate compressed data and metadata describing the compressed data (block 610). In one implementation, the producer uses delta color compression (DCC) to compress the raw data. In other implementations, the producer uses other compression schemes to compress the raw data. Then, the producer writes the compressed data and metadata to memory (block 615). In other implementations, the consumer decompresses the consumed data and saves it locally, updating the metadata. Next, one or more consumer clients (e.g., display controller) retrieve the metadata from memory (block 620). Then, the one or more consumer clients perform an analysis of the metadata to reduce the memory bandwidth utilization when consuming the compressed data (block 625). After block 625, method 600 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
   a plurality of client devices;
   a memory subsystem; and
   a communication fabric coupled to the plurality of client devices and the memory subsystem;
   wherein a first client device of the plurality of client devices comprises circuitry configured to:
      detect a memory access request targeting first data stored in the memory subsystem while the communication fabric is in a low-power state;
      retrieve metadata associated with the first data prior to the memory access request being sent to the communication fabric;
      prevent the memory access request from causing the communication fabric to exit the low-power state responsive to detecting a first condition based at least in part on an analysis of the metadata; and
      send previously retrieved second data to a first requesting agent responsive to detecting the first condition.

2. The system as recited in claim 1, wherein the first condition comprises determining that the first data is the same as the second data previously retrieved from the memory subsystem.

3. The system as recited in claim 1, wherein the first condition comprises determining that the first data is able to be derived from the second data previously retrieved from the memory subsystem.

4. The system as recited in claim 3, wherein responsive to detecting the first condition, the first client device is further configured to generate the first data from the second data.

5. The system as recited in claim 1, wherein responsive to detecting the first condition, the first client device is further configured to prevent the memory subsystem from exiting a low-power state to process the memory access request.

6. The system as recited in claim 1, wherein the metadata is generated by a second client device of the plurality of client devices.

7. The system as recited in claim 1, wherein the first client device is a display controller, and wherein the memory access request is targeting data of an idle screen being driven to a display.

8. A method comprising:
   detecting, by a first client device, a memory access request targeting first data stored in a memory subsystem while a communication fabric is in a low-power state;
   retrieving metadata associated with the first data prior to the memory access request being sent to the communication fabric;
   preventing the memory access request from causing the communication fabric to exit the low-power state responsive to detecting a first condition based at least in part on an analysis of the metadata; and
   sending previously retrieved second data to a first requesting agent responsive to detecting the first condition.

9. The method as recited in claim 8, wherein the first condition comprises determining that the first data is the same as the second data previously retrieved from the memory subsystem.

10. The method as recited in claim 8, wherein the first condition comprises determining that the first data is able to be derived from the second data previously retrieved from the memory subsystem.

11. The method as recited in claim 10, wherein responsive to detecting the first condition, the method further comprising generating the first data from the second data.

12. The method as recited in claim 8, wherein responsive to detecting the first condition, the method further comprising preventing the memory subsystem from exiting a low-power state to process the memory access request.

13. The method as recited in claim 8, wherein the metadata is generated by a second client device.

14. The method as recited in claim 8, wherein the first client device is a display controller, and wherein the memory access request is targeting data of an idle screen being driven to a display.

15. An apparatus comprising:
   a plurality of client devices; and
   a communication fabric coupled to the plurality of client devices;
   wherein the apparatus is configured to:
      detect a memory access request targeting first data while the communication fabric is in a low-power state, wherein the memory access request is generated by a first client device of the plurality of client devices;
      retrieve metadata associated with the first data prior to the memory access request being sent to the communication fabric;
      prevent the memory access request from causing the communication fabric to exit the low-power state responsive to detecting a first condition based at least in part on an analysis of the metadata; and
      send previously retrieved second data to a first requesting agent responsive to detecting the first condition.

16. The apparatus as recited in claim 15, wherein the first condition comprises determining that the first data is the same as the second data already stored by the apparatus.

17. The apparatus as recited in claim 15, wherein the first condition comprises determining that the first data is able to be derived from the second data already stored by the apparatus.

18. The apparatus as recited in claim 17, wherein responsive to detecting the first condition, the apparatus is further configured to generate the first data from the second data already stored by the apparatus.

19. The apparatus as recited in claim 15, wherein the metadata is generated by a second client device of the plurality of client devices.

20. The apparatus as recited in claim 15, wherein the first client device is a display controller, and wherein the memory access request is targeting data of an idle screen being driven to a display.

* * * * *